May 22, 1962  F. B. JACOB  3,036,203
WELDING APPARATUS
Filed April 25, 1960  2 Sheets-Sheet 1
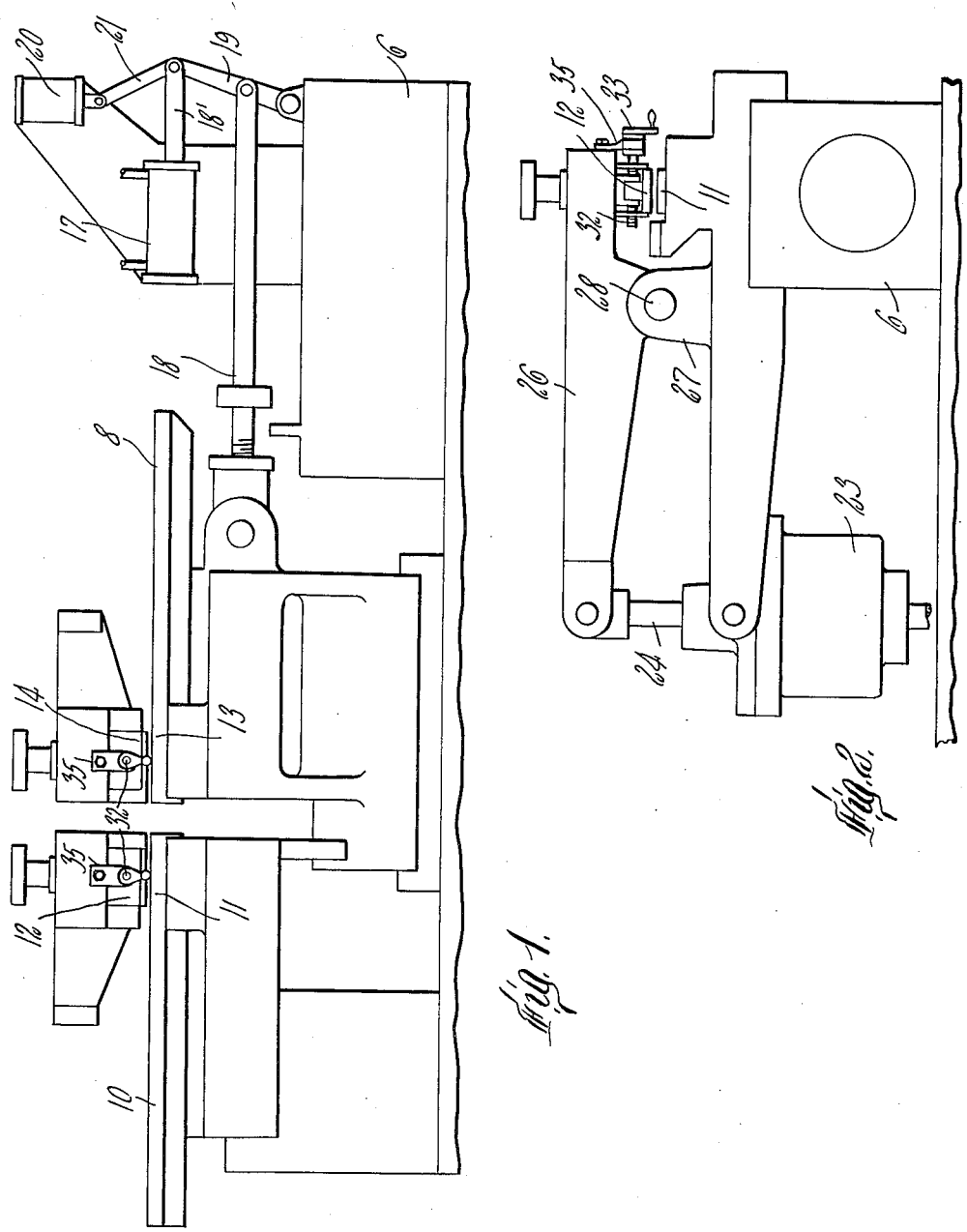

May 22, 1962  F. B. JACOB  3,036,203
WELDING APPARATUS
Filed April 25, 1960
2 Sheets-Sheet 2
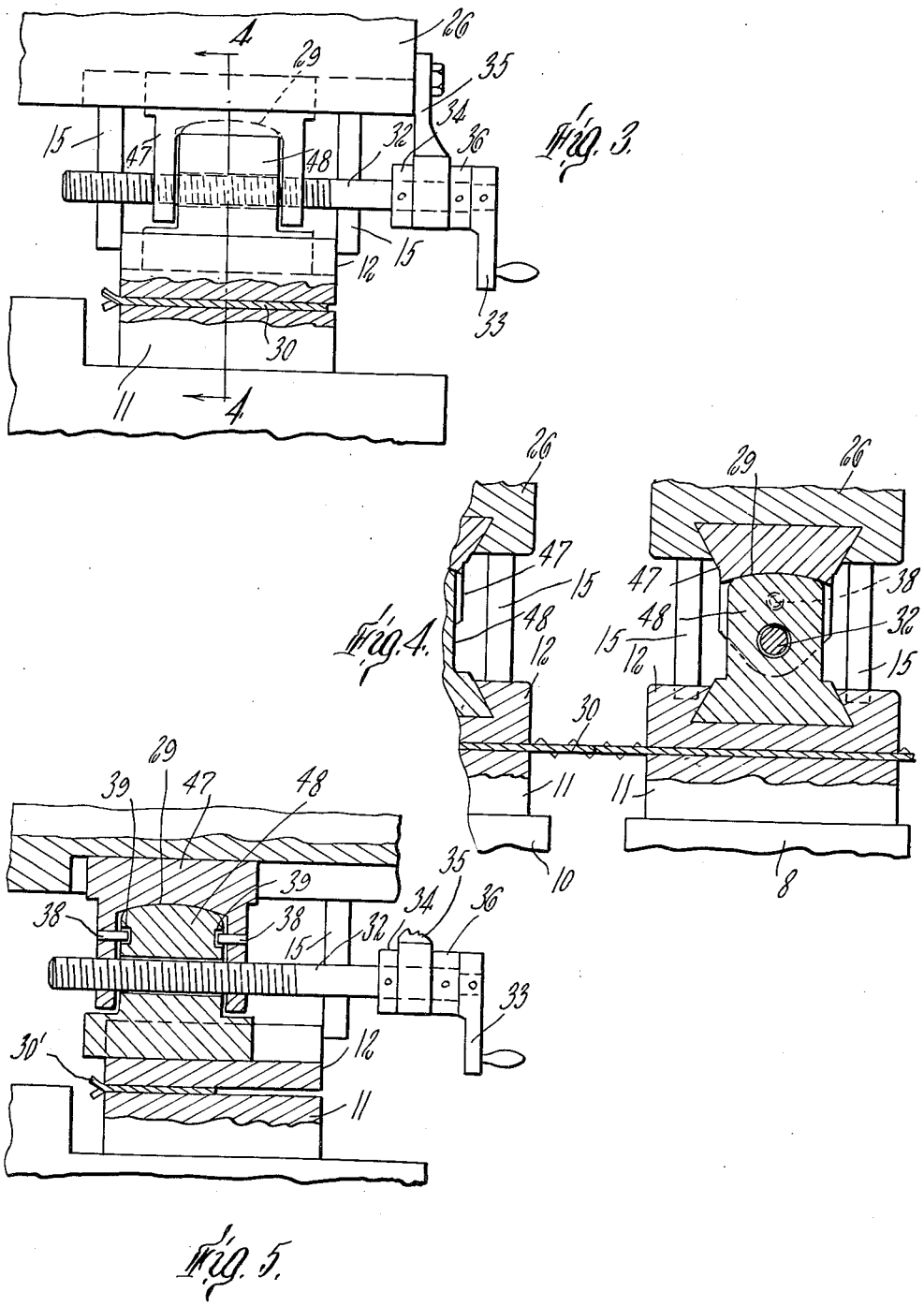

United States Patent Office 3,036,203
Patented May 22, 1962

3,036,203
WELDING APPARATUS
Fraser B. Jacob, Lynn, Mass., assignor to Seton Corporation, Providence, R.I., a corporation of Delaware
Filed Apr. 25, 1960, Ser. No. 24,439
7 Claims. (Cl. 219—101)

This invention relates generally to welding apparatus and more particularly it is concerned with electrical resistance welding of butted joints.

The object of the invention is to provide electrical resistance welding apparatus which can be used to advantage in the manufacture of band saw blades, wherein the ends of a straight strip having a row of set teeth along one edge thereof are butt welded to provide an endless looped blade.

A more specific object is to provide means for applying clamping pressure to blades of varying widths such that the pressure is applied generally centrally at least within the transverse dimension of the blade so that the clamping pressure is evenly distributed transversely of the blade ends to be welded, leaving free of the clamping means the set teeth of the blade along its one edge.

The novel features of the invention together with further objects and advantages will become apparent from the following detailed description and drawings to which it refers. In the drawings:

FIG. 1 is a front elevation of welding apparatus in accordance with the present invention;

FIG. 2 is a side elevation on an enlarged scale of the jaw operating mechanisms incorporated in the apparatus;

FIG. 3 is an enlargement of the mechanism for controlling the distribution of clamping pressure shown in FIG. 2;

FIG. 4 is a sectional view taken on line 4—4 of FIG. 3, and

FIG. 5 is a view like that of FIG. 3, but with the various parts of the apparatus disposed to accommodate a band saw blade of narrower width.

With reference now to the drawings, and FIG. 1 in particular, it will be observed that the numeral 10 has reference to a stationary platen for a first set of jaws including fixed lower jaw 11 and movable upper jaw 12 which function as one electrode of the welder, and the numeral 8 has reference to a movable platen for a second set of jaws including lower jaw 13 and movable upper jaw 14 which function as the other electrode. To move platen 8 toward and away from platen 10 there is associated with the frame 6 of the machine a hydraulic cylinder 17, the piston rod 18 of which is connected to movable platen 8. The motion of said platen is controlled by a toggle mechanism consisting of levers 19, 21 in turn controlled by a snubbing device 20, an extension 18' of said piston rod being connected to said levers. Such mechanism being fully described in Patent No. 2,875,319 need not be further described herein.

In FIG. 2 there is shown the mechanism which moves one of the jaws, the upper jaw 12, into and out of clamping position. This mechanism is seen to include a pressure fluid actuator designated generally by the numeral 23 which includes a piston 24. Piston 24 is pivotally connected at one end to a rocker arm 26 which carries the upper jaw 12, the arm 26 itself being mounted in trunnions 27 for pivotal movement about an intermediate point 28. As is apparent, another such mechanism is employed for the other jaw 14.

FIGS. 3 and 4 show in greater detail the mechanism which forms the subject of the present invention. With reference now to FIGS. 3 and 4 it will be observed that arm 26 is operatively connected to jaw 12 by a transversely extending slide formed with two interfitting parts 47 and 48 preferably having spherical bearing surfaces 29, although cylindrical bearing surfaces may be used if a lesser degree of freedom is acceptable. Mounting pins 38 mounted in the upper part 47 and extending into oversize bores 39 in the lower part 48 serve to hold the two parts loosely together while permitting self-alining operation thereof in operation. The latter permit relative angular movement of the parts about an axis which extends parallel to the direction of sliding movement in a transverse direction with respect to blade 30 to be welded. Each part is also seen to have a key portion disposed in dovetail-shaped keyways, one in the arm 26 and the other in the jaw 12. These keyways permit movement of the slide transversely of the work. Downwardly extending locating arms 15 are provided to maintain jaw 12 in a position alined with jaw 11. To produce such movement a threaded bore may be provided in the slide, and a screw element 32 be mounted in a support 35 extending downwardly from arm 26 for rotation by a crank 33 while engaged with the threads in the bore. Retaining members 34 and 36 serve to fix the axial position of the screw element. Other means, power or manual, may be utilized for moving the slidable upper jaw as required.

The operation of the apparatus according to the invention can best be understood with reference to FIGS. 3 and 5. For a relatively wide blade, that is, a blade having a width which is comparable to or greater than the corresponding dimension of the jaw, such as blade 30 of FIG. 3, the crank is rotated until the slide is substantially centered with respect to the jaw since the jaw can be centered over the blade. This insures that the clamping pressure created by arm 26 is applied within the transverse extent of the blade and hence is evenly distributed over the surface of the blade. For a narrower blade, such as blade 30' shown in FIG. 5, however, the jaw cannot be centered over the blade because this would entail clamping of the set teeth as well as the remainder of the blade, and would result in irreparable damage to the teeth. Instead, in accordance with the invention, the blade is clamped between the jaws with the set teeth exposed and free of the clamping means, the crank being turned until the slide is centered above the blade. This also creates a uniform clamping pressure across the blade as required for welds of uniformly high quality as the spherical bearing surfaces incorporated in the slide permit the jaw to become perfectly alined.

Although the invention has been described in connection with a single preferred embodiment, those skilled in the art will recognize that various modifications within the spirit and scope of the invention are possible. Therefore, the invention should not be deemed to be limited to the details of what has been described herein by way of example, but rather it should be deemed to be limited only to the scope of the appended claims.

What is claimed is:

1. In a welding machine having jaw means to hold the parts of the work to be welded and jaw support means to move the jaw means into and out of clamping position, means interposed between said jaw means and said jaw support means and movable relatively thereto to change the transverse position of said jaw means and said jaw support means, thereby to alter the distribution of clamping pressure upon the work.

2. A welding machine as claimed in claim 1 wherein said means interposed between said jaw means and said jaw support means are slide means provided for transverse movement relative to said jaw means and said jaw support means.

3. A welding machine as claimed in claim 1 wherein means are provided for angular movement of one of said jaw means relatively to the other of said jaw means.

4. In a welding machine having two pairs of jaws to hold the parts of the work to be welded in abutting relation to one another and a pair of movable members to move the respective pairs of jaws into and out of clamping position, the combination with at least one of said jaws and one of said movable members of each pair of slide means disposed in sliding engagement with said movable member and said jaw and constrained thereby to move transversely of the work to change the transverse position of said slide means and alter the distribution of clamping pressure upon the work.

5. In a welding machine as claimed in claim 4 wherein said slide means is formed with two interfitting parts having mating bearing surfaces to permit said parts to move angularly with respect to one another, a first of said parts being disposed in sliding engagement with said movable member and constrained thereby to move transversely of the work, and a second of said parts being disposed in sliding engagement with said one of the jaws and being constrained thereby to move in the same direction as said first-named part and alter the distribution of clamping pressure upon the work.

6. In a welding machine as claimed in claim 5, wherein said parts are provided with a threaded bore extending transversely of the work, and an axially fixed screw device mounted for rotation while engaged with the threads in said bore thereby to change the transverse position of said slide means and alter the distribution of clamping pressure upon the work.

7. In a welding machine the combination including two pairs of jaws to hold the parts of the work to be welded in abutting relation to one another, one jaw of each pair being movable in a controlled mode toward and away from the other jaw, a pair of members to move the respective movable jaws into and out of clamping position, a pair of slides connecting said movable jaws to said members, each slide being formed with two interfitting parts having spherical bearing surfaces to permit said parts to move angularly with respect to one another about an axis extending transversely of the work, said members and said movable jaws having dovetail-shaped keyways, said slides having key portions disposed in the respective keyways for sliding movement transversely of the work to change the transverse position of said slides and alter the distribution of clamping pressure upon the work.

References Cited in the file of this patent
UNITED STATES PATENTS
2,875,319    Stieglitz _____ Feb. 24, 1959